(12) United States Patent
Matajira (10) Patent No.: US 11,685,311 B2
(45) Date of Patent: Jun. 27, 2023

(54) SYSTEM AND METHOD FOR WARNING A DRIVER OF A VEHICLE OF AN OBJECT IN A PROXIMITY OF THE VEHICLE

(71) Applicant: Ningbo Geely Automobile Research & Development Co., Ltd., Ningbo (CN)

(72) Inventor: Juan Matajira, Floda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/336,478

(22) Filed: Jun. 2, 2021

(65) Prior Publication Data

US 2021/0316662 A1  Oct. 14, 2021

Related U.S. Application Data

(63) Continuation of application No. PCT/CN2019/118500, filed on Nov. 14, 2019.

(30) Foreign Application Priority Data

Dec. 12, 2018 (EP) ..................................... 18211852

(51) Int. Cl.
*H04N 1/409* (2006.01)
*B60R 1/00* (2022.01)
(Continued)

(52) U.S. Cl.
CPC ................ *B60R 1/00* (2013.01); *G06V 10/44* (2022.01); *G06V 20/58* (2022.01); *G06V 40/10* (2022.01);
(Continued)

(58) Field of Classification Search
CPC ................ B60R 1/00; B60R 2300/106; B60R 2300/205; B60R 2300/307; B60R 2300/8093; B60R 2300/103; B60R 2300/202; B60R 2300/301; G06V 20/58; G06V 10/44; G06V 40/10; H04N 7/18
See application file for complete search history.

(56) References Cited

U.S. PATENT DOCUMENTS

2005/0063565 A1  3/2005  Nagaoka
2010/0077437 A1*  3/2010  McManus ............... H04N 7/181
                                                              725/75
(Continued)

FOREIGN PATENT DOCUMENTS

CN      105835777 A      8/2016
CN      107424373 A      12/2017
(Continued)

OTHER PUBLICATIONS

International Search Report from corresponding International Application No. PCT/CN2019/118500, dated Feb. 12, 2020, 2 pages.

*Primary Examiner* — Howard D Brown, Jr.
(74) *Attorney, Agent, or Firm* — Tucker Ellis LLP (57) ABSTRACT

A warning system and a method for warning a driver of a vehicle of an object in a proximity of the vehicle. The system includes a device for detecting the object, a device for processing an image of the object based on the detection so that a representation indicative of the object is achieved, and a display for displaying the representation indicative of the object in the vehicle.

16 Claims, 9 Drawing Sheets

(51) Int. Cl.
*H04N 7/18* (2006.01)
*G06V 20/58* (2022.01)
*G06V 10/44* (2022.01)
*G06V 40/10* (2022.01)

(52) U.S. Cl.
CPC .......... *H04N 7/18* (2013.01); *B60R 2300/106* (2013.01); *B60R 2300/205* (2013.01); *B60R 2300/307* (2013.01); *B60R 2300/8093* (2013.01)

(56) References Cited

U.S. PATENT DOCUMENTS

| | | | |
|---|---|---|---|
| 2010/0128223 A1* | 5/2010 | Blumenthal | A61B 3/032 351/239 |
| 2010/0265345 A1 | 10/2010 | Andersson | |
| 2011/0199197 A1* | 8/2011 | Takatsudo | G06V 20/58 340/425.5 |
| 2014/0320664 A1* | 10/2014 | Hyun | G06V 40/173 348/159 |
| 2016/0031371 A1* | 2/2016 | Kimata | G06V 20/58 348/148 |
| 2018/0194285 A1 | 7/2018 | Herrmann | |
| 2018/0198955 A1* | 7/2018 | Watanabe | G08G 1/16 |
| 2018/0236986 A1 | 8/2018 | Kim | |
| 2018/0321798 A1* | 11/2018 | Kawamura | G06F 3/0481 |

FOREIGN PATENT DOCUMENTS

| | | |
|---|---|---|
| EP | 2141926 A1 | 1/2010 |
| EP | 3321913 A1 | 5/2018 |
| WO | 2015157410 A1 | 10/2015 |
| WO | 2016092537 A1 | 6/2016 |
| WO | 2018208006 A1 | 11/2018 |

* cited by examiner

SYSTEM AND METHOD FOR WARNING A DRIVER OF A VEHICLE OF AN OBJECT IN A PROXIMITY OF THE VEHICLE

RELATED APPLICATION DATA

This application is a continuation of International Patent Application No. PCT/CN2019/118500, filed Nov. 14, 2019, which claims the benefit of European Patent Application No. 18211852.1, filed Dec. 12, 2018, the disclosures of which are incorporated herein by reference in their entireties.

TECHNICAL FIELD

The invention relates to a system and method for warning a driver of a vehicle of an object in a proximity of the vehicle.

The invention may be arranged in any vehicle such as an electric or hybrid-electric vehicle and more specifically in e.g. a car, a truck, a bus, a work vehicle, excavator, dumper, compacting machine or forest machine, an off-road vehicle, or the like.

BACKGROUND

Visibility at night time while driving in places outside cities, e.g. in rural areas with lack of illumination, is limited and represents a safety issue not only for the driver and the passengers but also for pedestrians and living creatures walking around in these areas. Some of the dangers are the wild life, any obstacles or even people walking around in these areas which might be subject to an accident caused by poor visibility.

Hence, there is a need to improve visibility in a vehicle at non-optimal driving conditions such as at night time, in areas with poor illumination or at foggy conditions which impair the visibility.

Night vision camera systems are known however in order for the camera to obtain relevant images the camera must either be active at all times or activated by a user when the user finds it appropriate. A drawback from this is that the camera is not optimally used to obtain relevant images and relevant images may be missed in the continuous stream of images or if the user missed an opportunity to activate the camera.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An objective of the invention is to provide an efficient system for warning a driver of a vehicle of an object in a proximity of the vehicle.

This is achieved in that the system comprises a device for detecting the object, a device for processing an image of the object based on the detection so that a representation indicative of the object is achieved, and a display for displaying the representation indicative of the object in the vehicle.

An advantage of the warning system for warning a driver or a vehicle of an object in a proximity of the vehicle is that when a detection of the object has occurred, only then warn the driver. Hence, the driver of the vehicle can focus on the driving and avoid false warnings and keeping track of a continuous stream of images.

According to one example, the device for detecting the object may generate an image, which may be processed by the processing device so that a representation indicative of the object is achieved. According to another example, the device for detecting the object may only be used for detecting presence of the object, wherein in response to the detection, another device may obtain an image, which may be processed by the processing device so that a representation indicative of the object is achieved.

In some embodiments, the device for detecting the object comprises a radar device or a LIDAR device.

An advantage of a radar device or LIDAR device as detection means is that it can be active at all times without affecting the system or the driver while enabling a reliable detection of any object in proximity of the vehicle.

In some embodiments, the system further comprises a device for detecting thermal activity of the object.

An advantage of detecting thermal activity of the object is that living creatures or any other object that irradiates heat can be detected and the information from the detection of the thermal activity is used in generating a thermal image. Another advantage of detecting thermal activity, more specifically of living creatures, is that any movement of the object can be monitored and followed in proximity to the vehicle.

In some embodiments, the system comprises a device for obtaining the image of the object in response to the detection of the object.

An advantage of this embodiment is that a detailed image of the object may be obtained. Further, the device for obtaining an image of the object may be controlled so that it is only activated when a detection of the object has occurred, i.e. only when relevant images can be obtained. Another advantage is that the activation is optimized in terms of how long the device has to be active in order to obtain relevant images.

In some embodiments, the device for obtaining an image of the object comprises a multi-purpose camera or an IR camera or a night vision camera.

An advantage of having different devices for obtaining an image is that image obtaining can be adapted to different environments and to different types of objects such that the image obtaining is as reliable as possible.

In some embodiments, the device for processing the image comprises an interpretation arrangement for interpreting the image to remove any surroundings around the detected object or unnecessary information and a generating arrangement for generating the interpreted image into a representation indicative of the object to be displayed.

An advantage of processing the image is that any surroundings or any other disturbances in the obtained images can be removed such that the processed image is focused on the detected object and thereby generating a representation indicative of the object based on the processed image such that the driver is made aware of the danger ahead clearly and without disturbances on the display.

In some embodiments, the representation indicative of the object is a processed version of the obtained image illustrating the detected object.

An advantage of illustrating the detected object based on the processed version is that focus on the detected object is enhanced.

In some embodiments, the representation indicative of the object is a processed version of a radar detection illustrating a block or a silhouette corresponding to the contours of the object.

An advantage of illustrating the detected object based on the radar detection is that even if an obtained image lacks relevant information the radar detection still provides enough information to form a block or a silhouette of the detected object to warn the driver of a detected object in proximity of the vehicle.

In some embodiments, the warning system comprises a storage of a plurality of pre-determined figures, which represent different types of objects, wherein the device for processing the image is adapted to select a pre-determined figure indicative of the type of object in the image, from the set of pre-determined figures in the storage. According to one example, the storage comprises a first set of pre-determined figures representing different animals, which are commonly present in the geographical region where the vehicle is driving and provide a risk at collision. For example, such animals may comprise a moose, hare and badger. Thus, if a moose is detected along the road on which the vehicle is driving, the pre-determined moose figure is selected and presented for the driver.

An advantage of illustrating the detected object based on the radar detection is that even if an obtained image lacks relevant information the radar detection still provides enough to select a pre-determined figure from a set of pre-determined figures which match the detected object to warn the driver of a detected object in proximity of the vehicle.

In some embodiments, the display for displaying the representation indicative of the object comprises a heads-up display or any other vehicle integrated display.

An advantage of displaying the representation indicative of the object on a heads-up display or another vehicle integrated display is that the driver is made aware of any dangers in a convenient, realistic and user-friendly manner.

In some embodiments, the heads-up display is configured to display the representation indicative of the object on the windscreen in a position indicative of the objects position in relation to the vehicle.

An advantage of displaying the representation indicative of the object on the windscreen in a position indicative of the objects position in relation to the vehicle is that the driver is made aware of the position of the detected object in a user-friendly manner.

In some embodiments, the heads-up display is configured to display the processed and generated image on the windscreen based on position of the object in relation to the vehicle.

An advantage of displaying the representation indicative of the object on the windscreen based on the position of the object in relation to the vehicle is that the driver is made aware of the object's position in relation to the vehicle.

In some embodiments, the heads-up display is configured to display the representation indicative of the object on the windscreen based on driver seating position and location of the device for detecting the object and device for obtaining the image of the object in response to the detection of the object.

An advantage of displaying the representation indicative of the object on the windscreen based on driver seating position is that the driver perceives the representation indicative of the object in a user-friendly manner.

In some embodiments, the system may be automatically or manually turned on and off depending on driving conditions.

An advantage of turning on the system automatically at certain driving conditions is that the driver is not bothered with any turning on of the system but instead can focus on the driving. An advantage of turning on the system manually is that the driver may control the activation of the system irrespective of any driving conditions and may activate the system at his discretion.

In some embodiments, the driving conditions for automatically turning on the system comprise night time, areas with poor illumination or foggy conditions.

An advantage of automatically turning on the system at driving conditions which impair visibility is that the driver can focus on the driving and not on judging if the driving conditions are appropriate for turning on the system.

In some embodiments, the obtained image is temporally stored in a memory until it has been determined that no collision between the vehicle and the detected object has occurred.

An advantage of temporally storing the images in a memory is that these images are available for permanent storage if it is determined that a collision has occurred.

In some embodiments, the obtained image, position of the object in relation to the vehicle and the time of obtaining the image is permanently stored in a memory of the system if it is determined that a collision between the vehicle and the object has occurred.

An advantage of permanently storing the images in a memory is that these images can be used as evidence of the collision and how it came about.

In some embodiments, the obtained image is discarded if it is determined that no collision between the vehicle and the detected object has occurred.

An advantage of discarding the obtained images is that the memory is freed from the space and other images may be further stored in that memory.

In some embodiments, the representation indicative of the object is displayed on the whole windscreen or on a part of the windscreen.

An advantage of displaying the image on the whole or part of the windscreen is that presents options for the driver and his display preferences.

According to a second aspect, the disclosure regards a vehicle comprising the warning system according to the first aspect.

According to a third aspect, the disclosure regards a method for warning a driver of a vehicle of an object in proximity of the vehicle.

The method comprises detecting the object, processing an image of the object based on the detection so that a representation indicative of the object is achieved, and displaying the representation indicative of the object for the driver of the vehicle.

An advantage of the method for warning a driver or a vehicle of an object in a proximity of the vehicle is that when a detection of the object has occurred, only then warn the driver. Hence, the driver of the vehicle can focus on the driving and avoid false warnings and keeping track of a continuous stream of images.

In some embodiments, the method further comprises obtaining an image of the object in response to the detection of the object.

An advantage of obtaining an image of the object in response to the detection of the object is that the obtaining occurs only when a detection of the object has occurred, i.e. only when relevant images can be obtained. Another advantage is that the obtaining is optimized in terms of how long the device has to be active in order to obtain relevant images.

In some embodiments, the processing comprises interpreting the image to remove any surroundings around the detected object or unnecessary information and generating the interpreted image into a representation indicative of the object to be displayed.

An advantage of the processing is that any surroundings or any other disturbances in the obtained image can be removed such that the processed image is focused on the detected object and thereby generating a representation indicative of the object based on the processed image such that the driver is made aware of the danger ahead clearly and without disturbances on the display.

In some embodiments, the method further comprises displaying the representation indicative of the object on the windscreen based on position of the object in relation to the vehicle.

An advantage of displaying the representation indicative of the object on the windscreen based on the position of the object in relation to the vehicle is that the driver is made aware of the object's position in relation to the vehicle.

In some embodiment, the method further comprises storing the obtained image, the position of the detected object in relation to the vehicle and the time of obtaining the images temporally in a memory until it has been determined that no collision between the vehicle and the detected object has occurred.

An advantage of temporally storing the images in a memory is that these images are available for permanent storage if it is determined that a collision has occurred.

In some embodiments, the method further comprises storing the obtained image, the position of the detected object in relation to the vehicle and the time of obtaining the image permanently in a memory in the vehicle if it is determined that a collision between the vehicle and the detected object has occurred.

An advantage of permanently storing the images in a memory is that these images can be used as evidence of the collision and how it came about.

In some embodiments, the method further comprises discarding the obtained image, the position of the detected object in relation to the vehicle and the time of obtaining the image if it is determined that no collision between the vehicle and the object has occurred.

An advantage of discarding the obtained images is that the memory is freed from the space and other images may be further stored in that memory.

In some embodiments, the method further comprises displaying the representation indicative of the object on the whole windscreen or on a part of the windscreen.

An advantage of displaying the image on the whole or part of the windscreen is that presents options for the driver and his display preferences.

According to a fourth aspect, the disclosure regards a computer program product comprising a non-transitory computer readable medium having thereon a computer program comprising program instructions, wherein the computer program being loadable into a data processing unit and configured to cause execution of the method according to the third aspect of the invention when the computer program is run by the data processing unit.

Furthermore, this warning system may be connected to active safety arrangements such as braking, turning, adaptive cruise control (ACC), lane-change assistance etc. for an automatic control of the car in response to the detected object.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein may, however, be realized in many different forms and should not be construed as being limited to the embodiments set forth herein.

Figure 1:
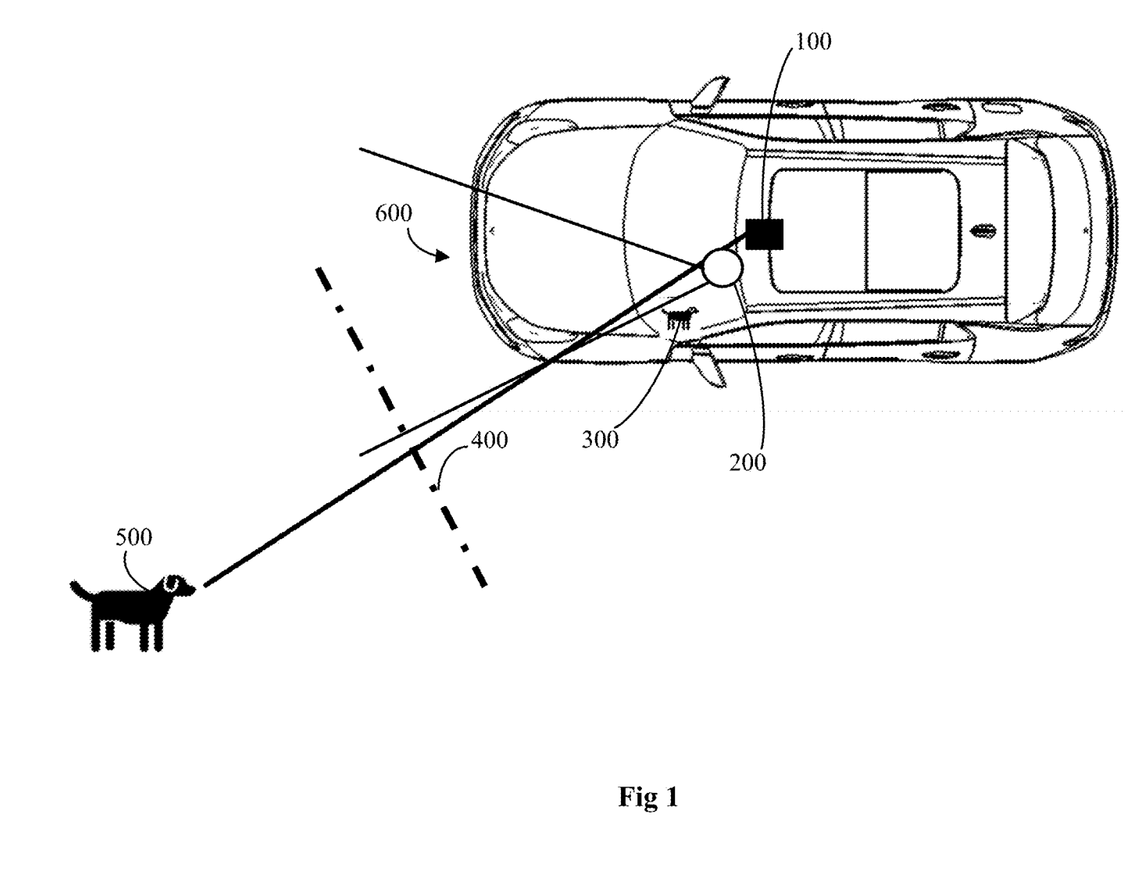
FIG. 1 is a schematic overview illustrating some embodiments.

FIG. 1 is a schematic overview illustrating some embodiments. More specifically, FIG. 1 illustrates a vehicle 600 comprising a warning system for warning a driver of a vehicle of an object 500 in a proximity 400 of the vehicle. The system comprises a device for detecting 100 the object e.g. a radar device or a LIDAR device and, in some embodiments, a device for obtaining 200 an image of the object, e.g. a multi-purpose camera or an IR camera or a night vision camera, in response to the detection of the object. The warning system further comprises a device for processing the image (not shown) by interpreting the obtained image and generating a representation indicative of the object based on the interpretation. The warning system further comprises a display 300 in the vehicle e.g. a heads-up display for displaying the representation indicative of the object i.e. illustrating the detected object in vehicle proximity. The heads-up display may in some embodiments be configured to display the representation indicative of the object on the windscreen based on position of the object in relation to the vehicle, furthermore the representation indicative of the object may in some embodiments be displayed on the whole windscreen or on a part of the windscreen. In some embodiments, the warning system may be automatically or manually turned on and off depending on driving conditions e.g. at night time, in areas with poor illumination or foggy conditions.

The device for obtaining 200 an image of the object may, in some embodiments, comprise an IR camera which is adapted for detecting thermal activity of the detected object 500. Any detected thermal activity of the detected object generates a thermal image which is processed by the device for processing the image such that thermal activity is interpreted and represented in a representation indicative of the object illustrating the detected object in the vehicle such that the driver is warned of e.g. a living creature in proximity of the vehicle. In addition to the thermal image the device for processing the image also processes information from the device for detecting 100 the object i.e. from a radar detection such as for example the location of the object which also is displayed in the vehicle together with the representation indicative of the object. In case the IR camera is not able to detect any thermal activity from the detected object, if the detected object is e.g. an obstacle, falling rock, avalanche, landslide, then only the radar detection will be processed to illustrate a block, a pre-determined figure e.g. a dog figure or a moose figure or a silhouette corresponding to the contours of the detected object in the representation indicative of the object.

The device for obtaining 200 an image of the object may, in some embodiments, comprise a multi-purpose camera which is adapted for obtaining an image of the detected object 500. The obtained image is processed by the device for processing the image such that the image is interpreted to remove any surroundings around the detected object or unnecessary information to generate a representation indicative of the object which illustrates the detected object in proximity of the vehicle clearly and without disturbances. In addition to the obtained image the device for processing the image also processes information from the device for detecting 100 of the object i.e. from a radar detection such as for example the location of the object which also is displayed in the vehicle together with the representation indicative of the object. In case the multi-purpose camera is not able to obtain an image with relevant information to process and if the radar detection indicates an object in proximity of the vehicle then only the radar detection will be processed to illustrate a block, a pre-determined figure e.g. a dog figure or a moose figure or a silhouette corresponding to the contours of the detected object in the representation indicative of the object.

The device for obtaining an image 200 of the object may, in some embodiments, comprise a night vision camera which is adapted for obtaining a night vision image of the detected object 500 at night time or in surroundings with poor illumination. The obtained night vision image is processed by the device for processing the image such that the image is interpreted to remove any surroundings around the detected object or unnecessary information to generate a representation indicative of the object which illustrates the detected object in proximity of the vehicle clearly and without disturbances. In addition to the obtained night vision image the device for processing the night vision image also processes information from the device for detecting 100 of the object i.e. a radar detection such as for example the location of the object 500 which also is displayed in the vehicle together with the representation indicative of the object. In case the night vision camera is not able to obtain an image with relevant information and if the radar detection indicates an object in proximity of the vehicle then the radar detection only will be processed to illustrate a block, a pre-determined figure e.g. a dog figure or a moose figure or a silhouette corresponding to the contours of the detected object in the representation indicative of the object.

Figure 2:
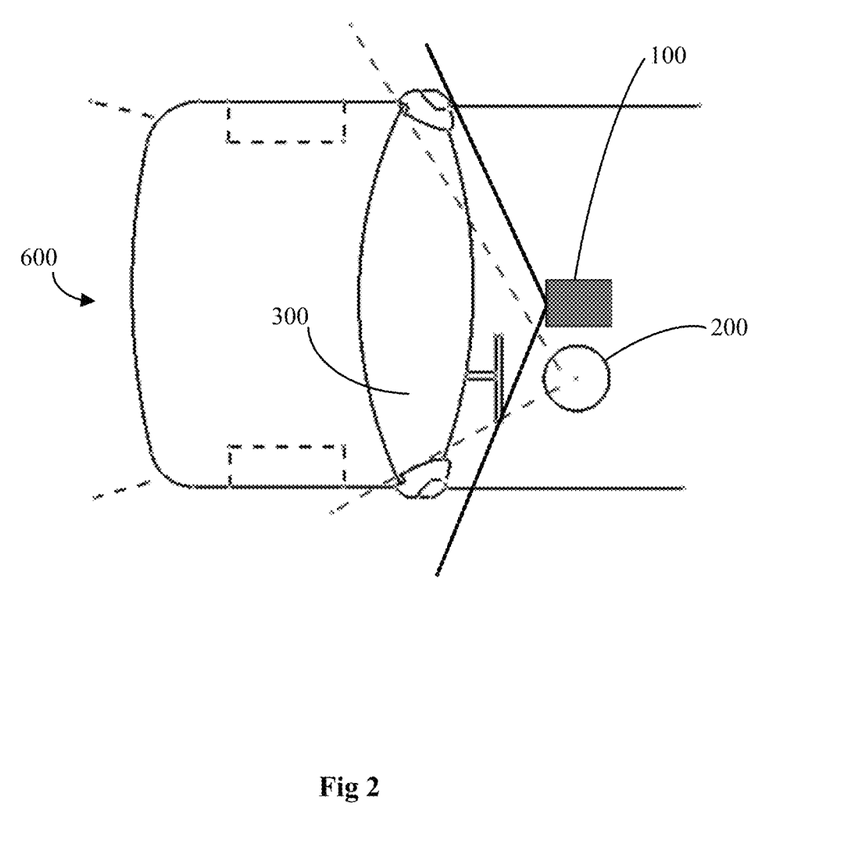
FIG. 2 is a schematic overview illustrating some embodiments.

FIG. 2 is a schematic overview illustrating some embodiments. More specifically, FIG. 2 illustrates a vehicle 600 comprising a warning system for warning a driver of a vehicle of an object in a proximity of the vehicle. The system comprises a device for detecting 100 the object e.g. a radar device or a LIDAR device and, in some embodiments, a device for obtaining an image of the object 200, e.g. a multi-purpose camera or an IR camera or a night vision camera, in response to the detection of the object. The device for obtaining an image 200 of the object may comprise a camera with a wide angle greater than the driver's visibility angle. The device for obtaining an image 200 of the object may further support all different seating positions based on percentile and syncs of the outside view to inside view. In some embodiments, the heads-up display is configured to display the representation indicative of the object on the windscreen based on driver seating position and location of the device for detecting the object and device for obtaining the image of the object in response to the detection of the object.

Figure 3:
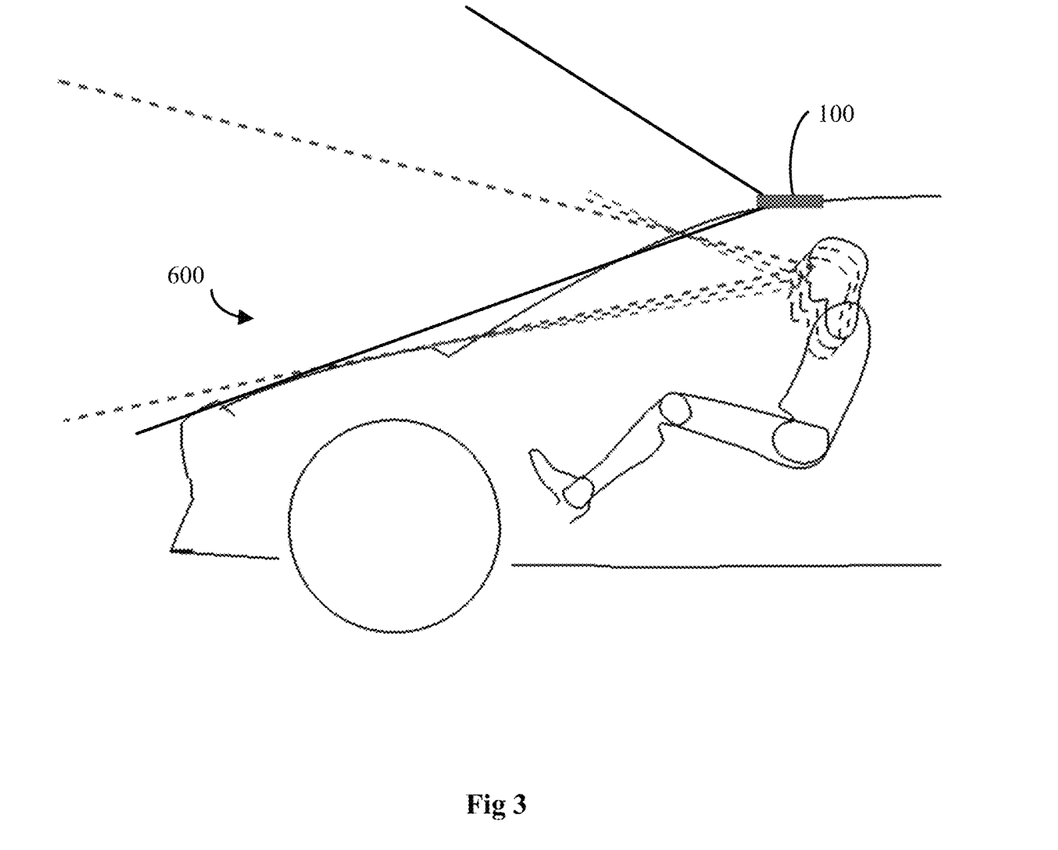
FIG. 3 is a schematic overview illustrating some embodiments.

FIG. 3 is a schematic overview illustrating some embodiments. More specifically, FIG. 3 illustrates a vehicle 600 comprising a warning system for warning a driver of a vehicle of an object in a proximity of the vehicle. The system 700 comprises a device for detecting 100 the object e.g. a radar device or a LIDAR device and, in some embodiments, a device for obtaining an image (not shown) of the object, e.g. a multi-purpose camera or an IR camera or a night vision camera, in response to the detection of the object. The device for detecting an object 100 comprises means with visibility range according to vehicle specifications in different seating positions.

Figure 4A:
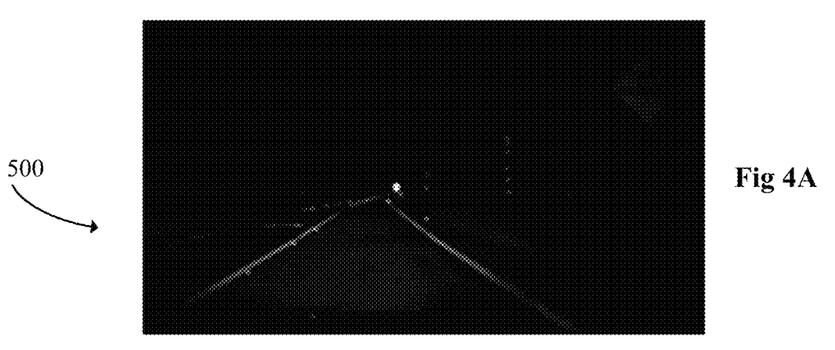
FIGS. 4A-4D are images illustrating some embodiments.
Figure 4B:
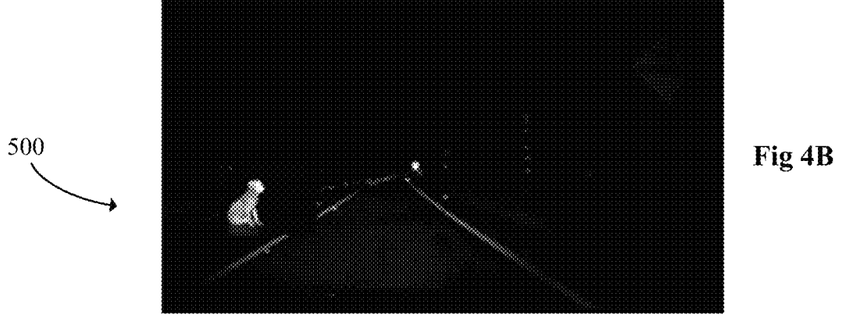
Figure 4C:
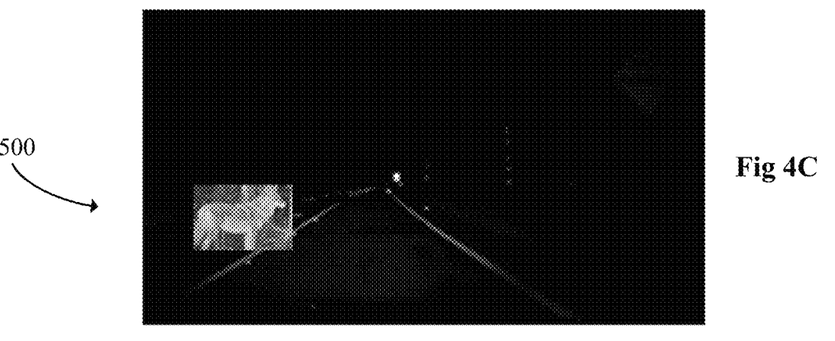
Figure 4D:
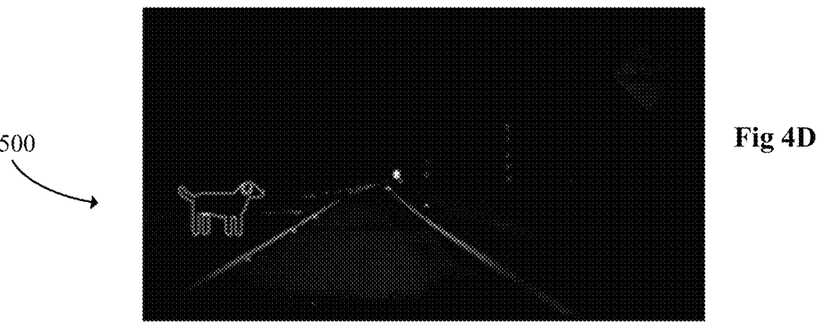

FIGS. 4A-4D are images illustrating some embodiments. More specifically, in FIG. 4A, the image represents the visibility or the lack of visibility at night time from the vehicle. In FIG. 4B, the image represents a thermal image obtained by an IR camera which is adapted for detecting thermal activity of the detected object 500. The detected thermal activity of the detected object generates a thermal image which is processed by the device for processing the image such that thermal activity is interpreted and represented in a representation indicative of the object illustrating the detected object in the vehicle such that the driver is warned of e.g. a living creature in proximity of the vehicle. In addition to the thermal image the device for processing the image also processes information from the device for detecting the object i.e. from a radar detection such as for example the location of the object which also is displayed in the vehicle together with the representation indicative of the object. In FIG. 4C, the image represents a night vision image obtained by a night vision camera which is adapted for obtaining a night vision image of the detected object 500 at night time or in surroundings with poor illumination. The obtained night vision image is processed by the device for processing the image such that the image is interpreted to remove any surroundings around the detected object or unnecessary information to generate a representation indicative of the object which illustrates the detected object in proximity of the vehicle clearly and without disturbances. In addition to the obtained night vision image the device for processing the night vision image also processes information from the device for detecting of the object i.e. a radar detection such as for example the location of the object 500 which also is displayed in the vehicle together with the representation indicative of the object. In FIG. 4D, the image represents a radar interpreted representation indicative of the object detected by the device for detecting the object. In case the device for obtaining an image, e.g. the IR camera or the night vision camera, is not able to obtain an image with relevant information and if the radar detection indicates an object in proximity of the vehicle then the radar detection only will be processed to illustrate a block, a pre-determined figure e.g. a dog figure or a moose figure or a silhouette corresponding to the contours of the detected object in the representation indicative of the object according to the detected object.

Figure 5:
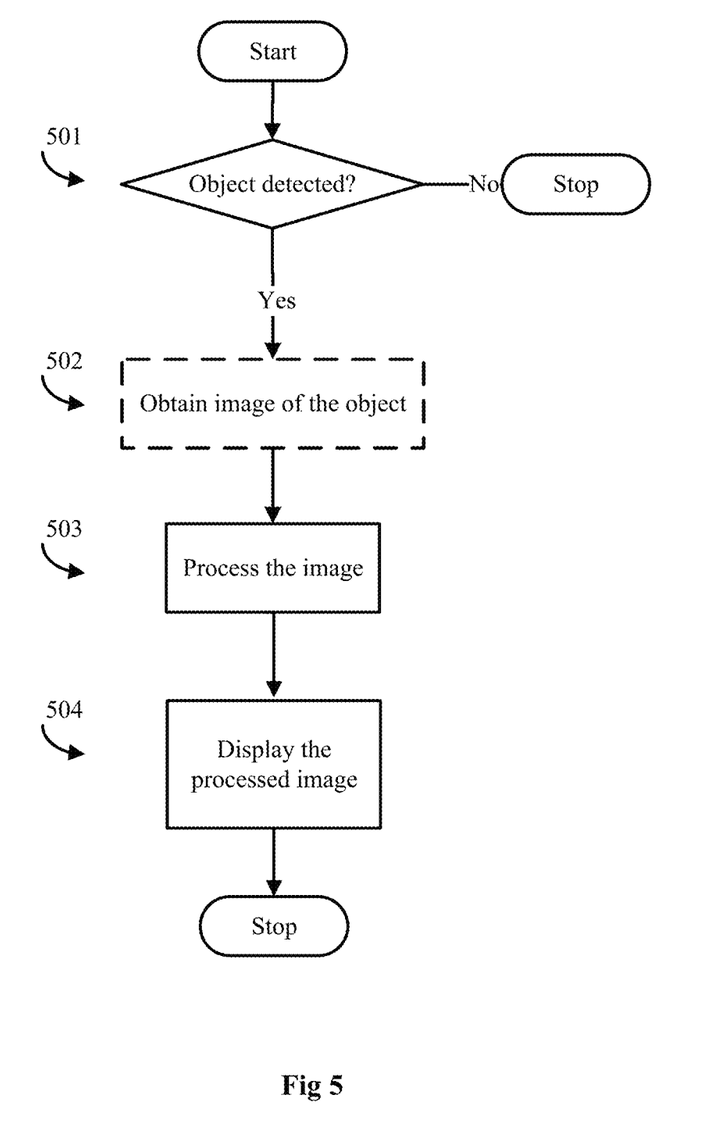
FIG. 5 is a flowchart illustrating example method steps according to some embodiments.

FIG. 5 is a flowchart illustrating example method steps according to some embodiments. More specifically, FIG. 5 illustrates a method for warning a driver of a vehicle of an object in proximity of the vehicle. The method comprises a detection 501 of the object, in some embodiments, obtaining an image 502 of the object in response to the detection of the object, processing 503 the image, and displaying the representation 504 indicative of the object for the driver of the vehicle by means of a vehicle integrated display such as a heads-up display.

Figure 6:
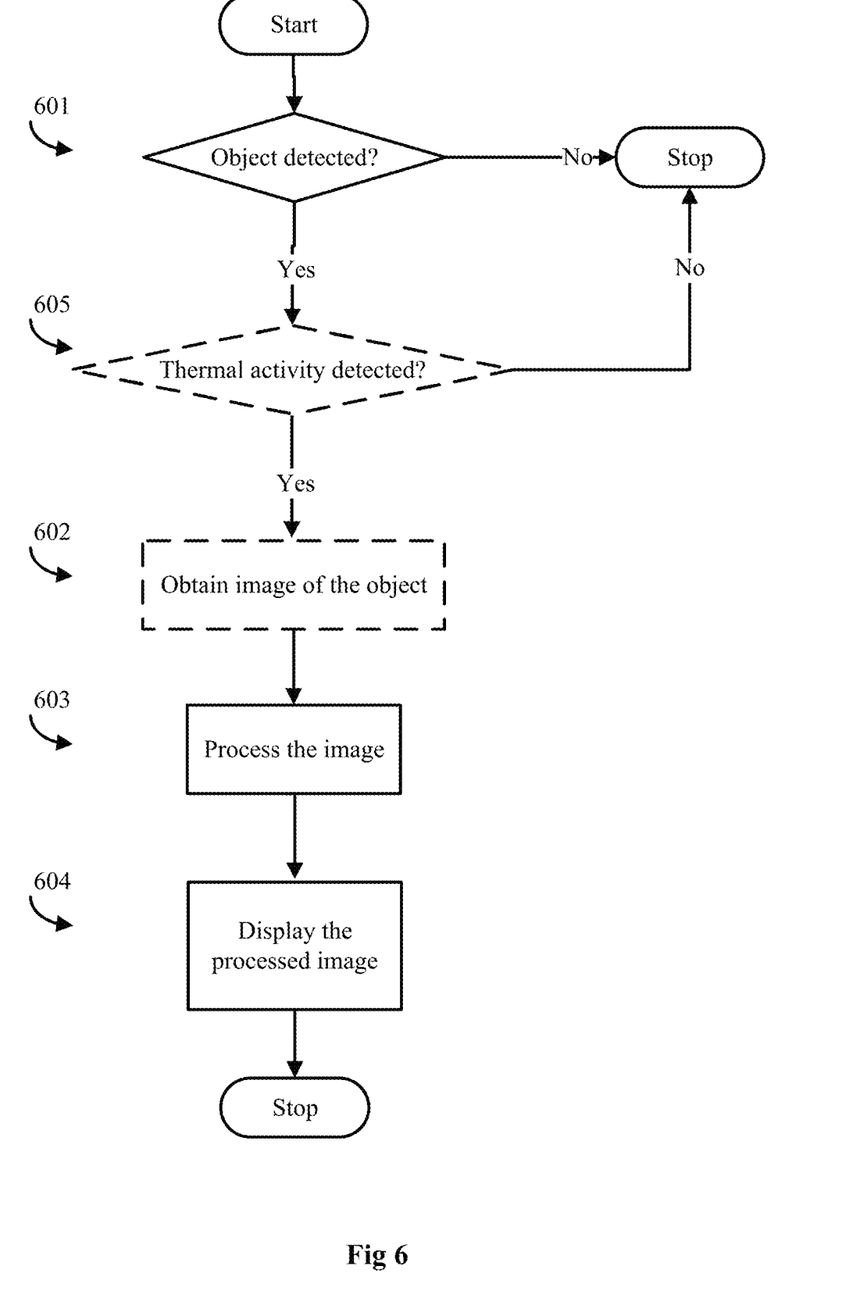
FIG. 6 is a flowchart illustrating example method steps according to some embodiments.

FIG. 6 is a flowchart illustrating example method steps according to some embodiments. More specifically, FIG. 6 illustrates a method for warning a driver of a vehicle of an object in proximity of the vehicle. The method comprises a detection 601 of the object, optionally if the system utilizes an IR camera a thermal detection 605 of the object is also performed and if detection is positive, in some embodiments, obtaining an image 602 of the object in response to the detection of the object, processing the image 603, and displaying the representation 604 indicative of the object for the driver of the vehicle by means of a vehicle integrated display such as a heads-up display.

Figure 7:
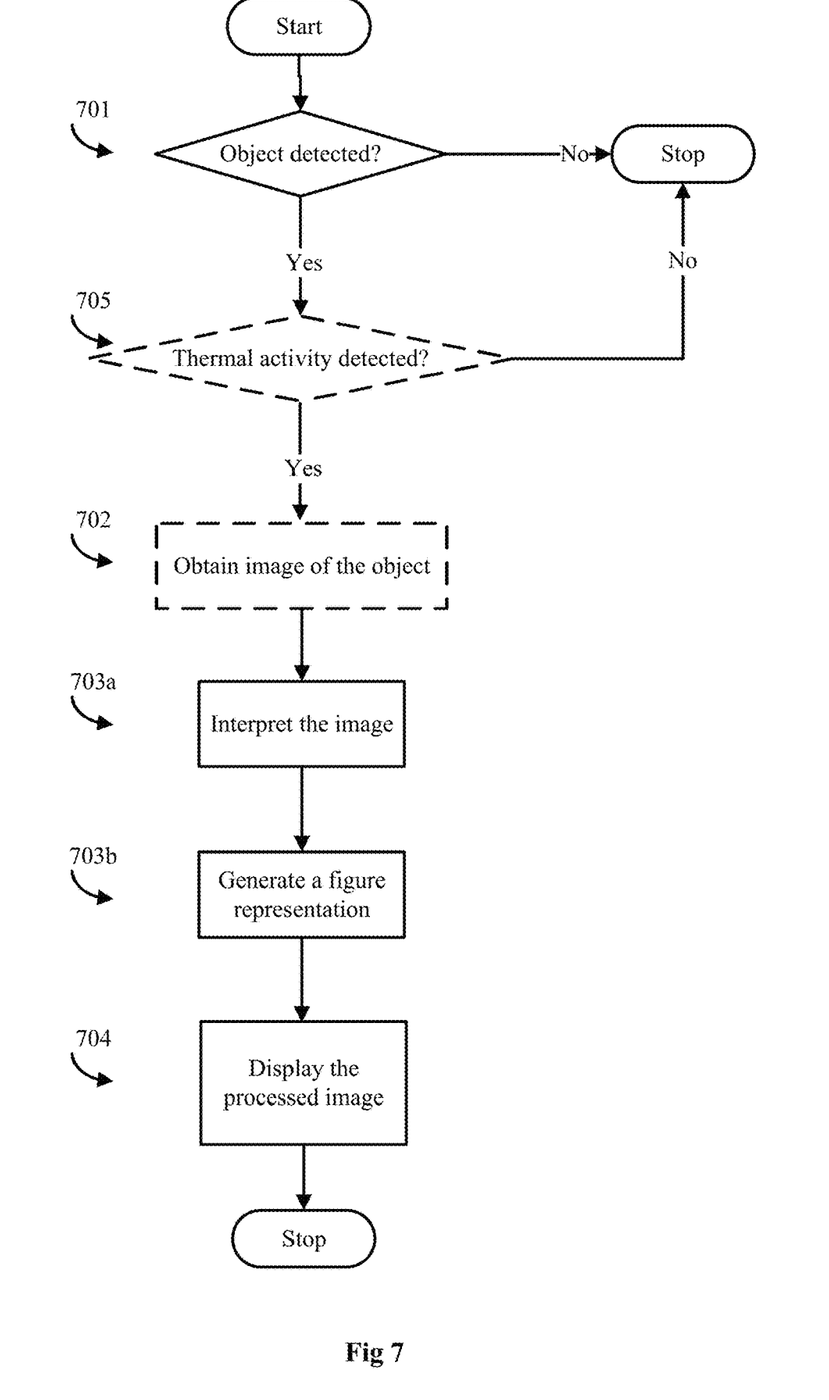
FIG. 7 is a flowchart illustrating example method steps according to some embodiments.

FIG. 7 is a flowchart illustrating example method steps according to some embodiments. More specifically, FIG. 7 illustrates a method for warning a driver of a vehicle of an object in proximity of the vehicle. The method comprises a detection 701 of the object, optionally if the system utilizes an IR camera a thermal detection 705 of the object is also performed and if detection is positive, in some embodiments, obtaining an image 702 of the object in response to the detection of the object, processing the image by firstly interpreting the image 703a wherein any surroundings or unnecessary information other than information on the detected object are removed from the image and secondly generating a representation 703b indicative of the object accordingly, and displaying the representation 704 indicative of the object for the driver of the vehicle by means of a vehicle integrated display such as a heads-up display.

Figure 8:
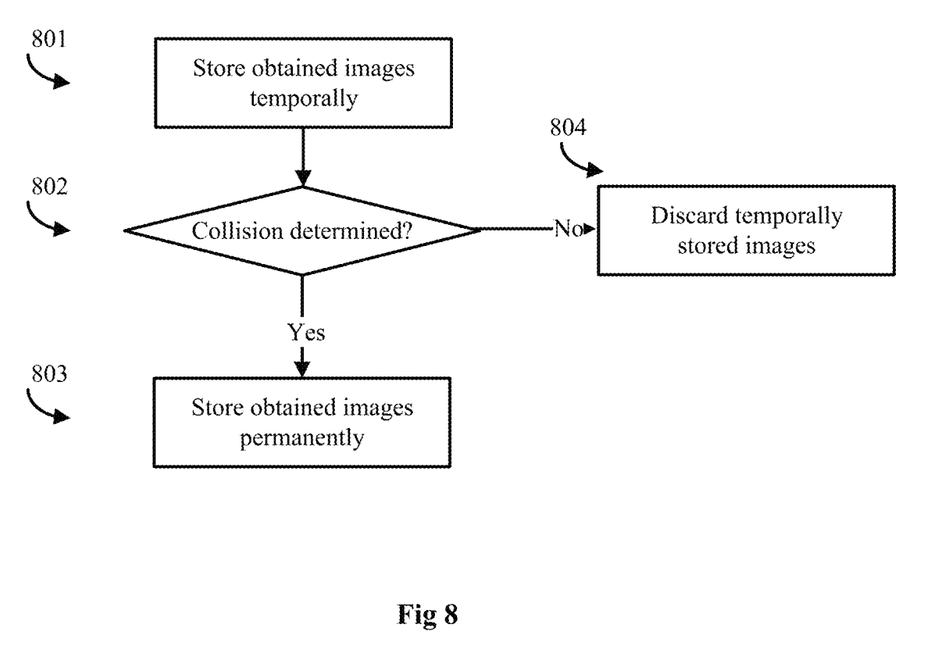
FIG. 8 is a flowchart illustrating example method steps according to some embodiments.

FIG. 8 is a flowchart illustrating example method steps according to some embodiments. More specifically, FIG. 8 illustrates storing of obtained images in case of collision between vehicle 600 and detected object 500. The method comprises temporally storing obtained images 801, thereafter determining if a collision has occurred 802, if the determination is negative the obtained images are discarded 804 but if the determination is positive the images are stored permanently 803 along with position of the object in relation to the vehicle and the time of obtaining the image.

Figure 9:
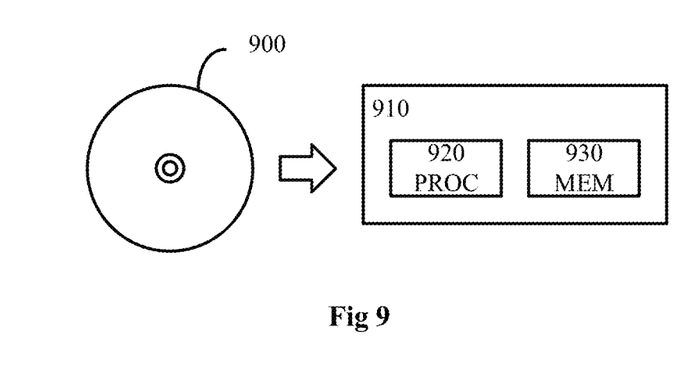
FIG. 9 is a schematic drawing illustrating an example computer readable medium according to some embodiments.

FIG. 9 is a schematic drawing illustrating an example computer readable medium according to some embodiments. More specifically, FIG. 9 illustrates an example computer readable medium in the form of a compact disc (CD) ROM 900. The computer readable medium has stored thereon a computer program 910 comprising program instructions. The computer program is loadable into a data processor PROC 920, which may, for example, be comprised in a vehicle 600. When loaded into the data processing unit, the computer program may be stored in a memory MEM 930 associated with or comprised in the data-processing unit.

According to some embodiments, the computer program may, when loaded into and run by the data processing unit, cause execution of method steps according to, for example, any of the methods illustrated in FIGS. 5, 6, 7, 8 or otherwise described herein.

Figure 10:
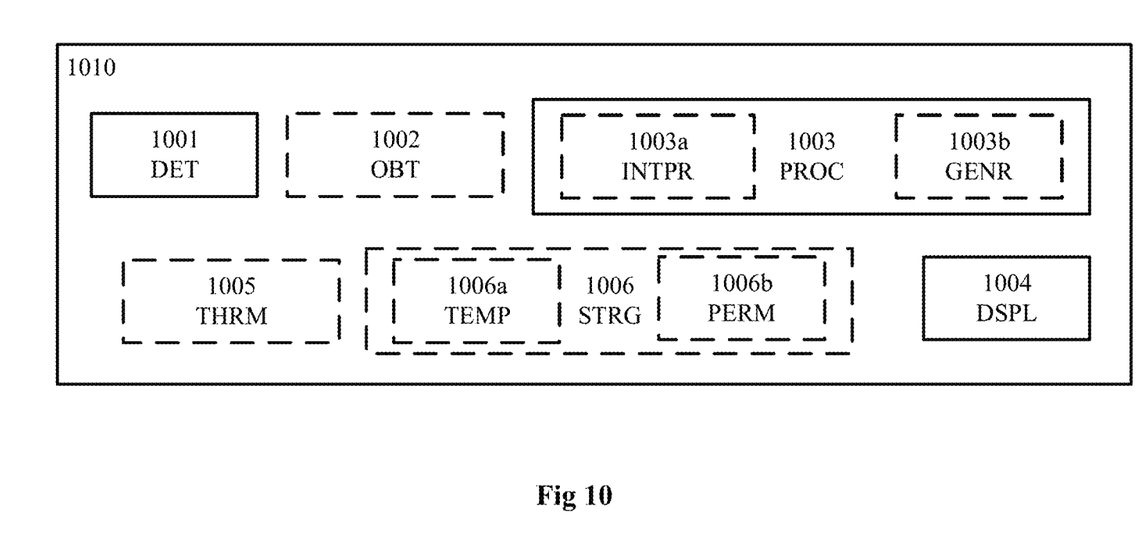
FIG. 10 is a schematic block diagram illustrating an example arrangement according to some embodiments.

FIG. 10 is a schematic block diagram illustrating an example arrangement according to some embodiments. More specifically, FIG. 10 illustrates an example arrangement 1010 of a warning system for warning a driver of a vehicle of an object in a proximity of the vehicle comprising a detection arrangement DET 1001, e.g. detection circuitry or a detection module, configured to detect the object, in some embodiments, an image obtaining arrangement OBT 1002, e.g. image obtaining circuitry or an image obtaining module, configured to obtain an image of the object in response to the detection of the object, a processing arrangement PROC 1003, e.g. processing circuitry or processing module, configured to process the image, in some embodiments, by means of an interpretation arrangement INTPR 1003a, e.g. interpretation circuitry or an interpretation module, configured to interpret the obtained image to remove surroundings or any other unnecessary information other than information on the detected object and, in some embodiments, a generating arrangement GENR 1003b, e.g. generating circuitry or a generating module, for generating a representation indicative of the object to be displayed, and a displaying arrangement DSPL 1004, e.g. display circuitry or a display module, for displaying the representation indicative of the object in the vehicle in a vehicle-integrated display such as a heads-up display. The arrangement 1010 optionally further comprises a thermal detection arrangement THRM 1005, e.g. thermal detection circuitry or thermal detection module, configured to detect thermal activity of a detected object and a storage arrangement STRG 1006, e.g. storage circuitry or storage module, configured to store obtained images by means of a temporary storage arrangement TEMP 1006a, temporary storage circuitry or temporary storage module, configured to temporally store obtained images and a permanent storage arrangement PERM 1006b, permanent storage circuitry or permanent storage module, configured to permanently store obtained images along with position of the detected object in relation to the vehicle and the time of obtaining the image.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware.

Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A warning system for warning a driver of a vehicle of an object in a proximity of the vehicle, comprising:
    a device for detecting the object,
    a device for obtaining an image of the object in response to the detection of the object, wherein the device for obtaining the image of the object comprises a multi-purpose camera or an IR camera or a night vision camera,
    a device for processing the image of the object based on the detection of the object so that a representation indicative of the object is achieved,
    wherein the warning system further comprises a storage of a plurality of pre-determined figures which represent different types of objects, wherein the device for processing the image is adapted to select a pre-determined figure indicative of the type of object in the image, from the set of pre-determined figures in the storage, the selection of the pre-determined figure made upon the detection of the object by the device for detecting the object and upon making a determination that the obtained image of the object cannot be processed by the device for processing the image, and wherein the device for processing the image further comprises an interpretation arrangement for interpreting the detected object to remove any surroundings around the detected object or unnecessary information wherein the surroundings around the detected object or unnecessary information is removed such that the processed image is focused on the detected object and a generating arrangement for generating an interpreted image comprising the pre-determined figure indicative of the type of object in the image into the representation indicative of the object to be displayed, and
    a display for displaying the representation indicative of the object in the vehicle.

2. The warning system according to claim 1, wherein the device for detecting the object comprises a radar device or a LIDAR device.

3. The warning system according to claim 1, further comprising a device for detecting thermal activity of the object.

4. The warning system according to claim 1, wherein the representation indicative of the object is a processed version of the obtained image illustrating the detected object.

5. The warning system according to claim 1, wherein the representation indicative of the object is a processed version illustrating a block or a silhouette corresponding to the contours of the object.

6. The warning system according to claim 1, wherein the display for displaying the representation indicative of the object comprises a heads-up display or any other vehicle integrated display.

7. The warning system according to claim 6, wherein the heads-up display is configured to display the representation indicative of the object on the windscreen in a position indicative of the objects position in relation to the vehicle.

8. The warning system according to claim 1, wherein the warning system further comprises a memory adapted for temporarily storing the obtained image until it has been determined that no collision between the vehicle and the detected object has occurred.

9. The warning system according to claim 1, wherein the warning system further comprises a memory adapted for permanently storing the obtained image, position of the object in relation to the vehicle and the time of obtaining the image if it is determined that a collision between the vehicle and the object has occurred.

10. The warning system according to claim 1, wherein the warning system is further adapted to discard the obtained image if it is determined that no collision between the vehicle and the detected object has occurred.

11. A vehicle comprising the warning system according to claim 1.

12. A method for warning a driver of a vehicle of an object in proximity of the vehicle, comprising the following steps:
    detecting the object, obtaining an image of the object in response to the detection of the object by a multi-purpose camera or an IR camera or a night vision camera, processing the detection of the object so that a representation indicative of the object is achieved, and the processing of the object further comprising selecting a pre-determined figure indicative of the type of object detected, from a set of pre-determined figures in a storage, the selection of the pre-determined figure made upon making a determination that the object is detected and that the obtained image of the object cannot be processed, interpreting the detected object to remove any surroundings around the detected object or unnecessary information wherein the surroundings around the detected object or unnecessary information is removed such that a processed image is focused on the detected object, generating an interpreted image comprising the pre-determined figure indicative of the type of object in the image into the representation indicative of the object to be displayed, and displaying the representation indicative of the object for the driver of the vehicle.

13. A non-transitory computer readable medium having stored thereon a computer program comprising program instructions, wherein the computer program being loadable into a data processing unit and configured to cause execution of the method according to claim 12 when the computer program is run by the data processing unit.

14. The warning system according to claim 1, wherein the selection of the pre-determined figure is made upon occurrence of the following:

detection of the object by the device for detecting the object; and upon making a determination that no image of the object was captured using the device for obtaining the image of the object.

15. A warning system for warning a driver of a vehicle of an object in a proximity of the vehicle, comprising:

a detection device configured to detect the object;

an image capture device configured to obtain an image of the object in response to the detection of the object, wherein the image capture device comprises a multi-purpose camera or an IR camera or a night vision camera;

an image processing device configured to process the image of the object based on a detection of the object by the detection device, so that a representation indicative of the object is achieved;

a storage of a plurality of pre-determined figures which represent different types of objects, wherein the image processing device is adapted to select a pre-determined figure indicative of the type of object in the image, from the set of pre-determined figures in the storage, the selection of the pre-determined figure made upon the detection of the object by the detection device and upon making a determination that the image obtained with the image capture device cannot be processed by the image processing device;

a generating arrangement for generating an interpreted image comprising the pre-determined figure indicative of the type of object in the image into the representation indicative of the object to be displayed, and a display for displaying the representation indicative of the object in the vehicle.

16. The warning system according to claim 15, wherein the selection of the pre-determined figure is made upon occurrence of the following:

detection of the object by the detection device; and upon making a determination that no image of the object was captured using image capture device.

* * * * *